MATERIAL-HANDLING APPARATUS

Filed Feb. 18, 1957 5 Sheets-Sheet 1

INVENTOR.
C. W. BOPP

BY [signature]

ATTORNEY

Aug. 29, 1961 C. W. BOPP 2,998,149

MATERIAL-HANDLING APPARATUS

Filed Feb. 18, 1957 5 Sheets-Sheet 2

*INVENTOR.*
C. W. BOPP

BY

ATTORNEY

INVENTOR.
C. W. BOPP
BY [signature]
ATTORNEY

INVENTOR.
C. W. BOPP

BY [signature]

ATTORNEY

INVENTOR.
C. W. BOPP

BY

ATTORNEY

United States Patent Office 2,998,149

Patented Aug. 29, 1961

2,998,149
MATERIAL-HANDLING APPARATUS

Cecil W. Bopp, Waterloo, Iowa, assignor to Bopp Mfg., Inc., Waterloo, Iowa, a corporation of Iowa Filed Feb. 18, 1957, Ser. No. 640,674
3 Claims. (Cl. 214—75)

This invention relates to material-handling apparatus and more particularly to a novel and improved mast-boom-hoist arrangement adapted to be mounted, for example, on the bed of a motor truck.

In a typical apparatus of the character referred to, and especially one adapted for the handling of concrete or cinder building blocks, a motor truck or other portable base will include a mast about the upper end of which a horizontal boom is swingable during the loading and unloading operations. A carriage runs lengthwise of the boom and includes a hoist-supported fork for carrying what is known as a "cube" of blocks (an orderly stack of blocks weighing approximately 3,000–4,000 lbs.). The general utility of the apparatus is best appreciated at a building site because the swinging boom and fork is capable of distributing cubes about the site for the convenience of those who lay up the blocks as a foundation or wall.

Although, as pointed out above, the basic characteristics of the apparatus are well known, experience with available mechanisms reveals the need for improvement, and it is accordingly a principal object of this invention to improve the over-all mechanism in the interests of economy, utility, production and maintenance.

The invention features a novel and improved mounting of the boom on the mast by means of separate sets of bearing means, certain of which take vertical thrust loads and others of which take horizontal radial loads. It is a further object to construct the mast and journaled parts of the boom of simple, inexpensive cylindrical tubing, thereby reducing cost and requiring a minimum of machining and other time-consuming shop operations. A still further object is to provide a mast structure as an attachment unit suited for mounting on a conventional motor truck bed. The improved mast structure further incorporates provisions for accommodating axially therewithin a novel fluid conduit means for conducting fluid to and from one or more fluid-pressure-operated motors carried on the boom.

It is a significant object of the invention to provide means for turning the boom about the mast axis, to locate this means under the base or bed of the truck, and to utilize an improved fluid motor and cable and sheave arrangement for that purpose. In this respect, this arrangement features a simple and efficient means for guiding a reciprocating head carried by the piston of the mast-operating motor.

It is a salient object of the invention to provide means for locking the boom against swinging during transport thereof and to include in this means provisions for stabilizing the boom against excessive vibration, rattling, etc. This means is also characterized by the remote control operation in the interests of convenience.

A further object of the invention, in a modified form thereof, relates to the provision of means for handling additional cubes or equivalent material on a bed or base having a load-supporting area beyond the reach of the boom, this means in its simplest aspect involving an additional load-carrying means that can be moved selectively into or out of the range of the boom.

Still further and none-the-less important objects pertain to an improved carriage including tiltable sheaves, an improved mounting of the carriage on the boom, convenient control for the several fluid-pressure-operated motors, and such other features inherent in and encompassed by the invention as will appear from the ensuing description of preferred embodiments of the invention as shown, by way of example, in the accompanying drawings, the several figures of which are described immediately below.

Throughout the following description such expressions as "front," "rear," "right," "left" etc. will be used as terms of convenience and not of limitation, for it will be recognized that the geographical natures of the basic components can obviously be otherwise arranged.

Figure 1:
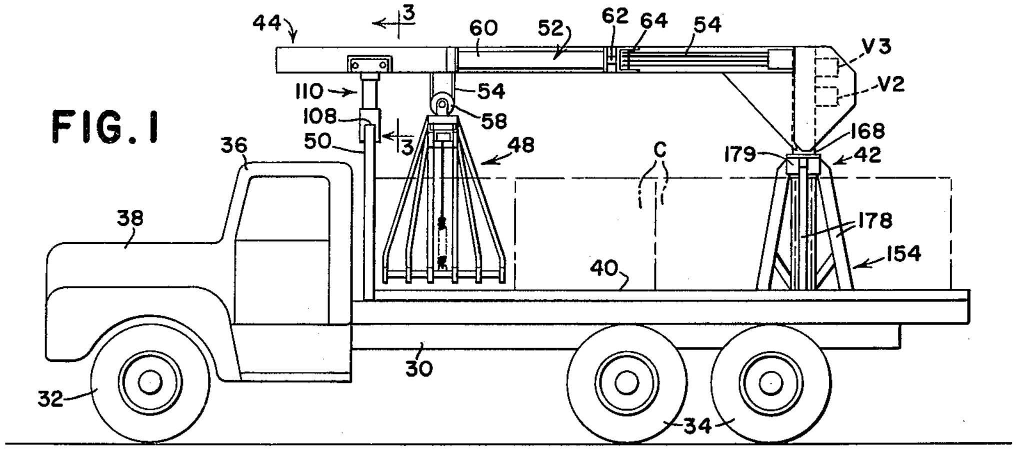
FIG. 1 is a side elevation of a truck equipped with the novel apparatus, showing the load in dot-dash lines.
Figures 2, 3, 4:
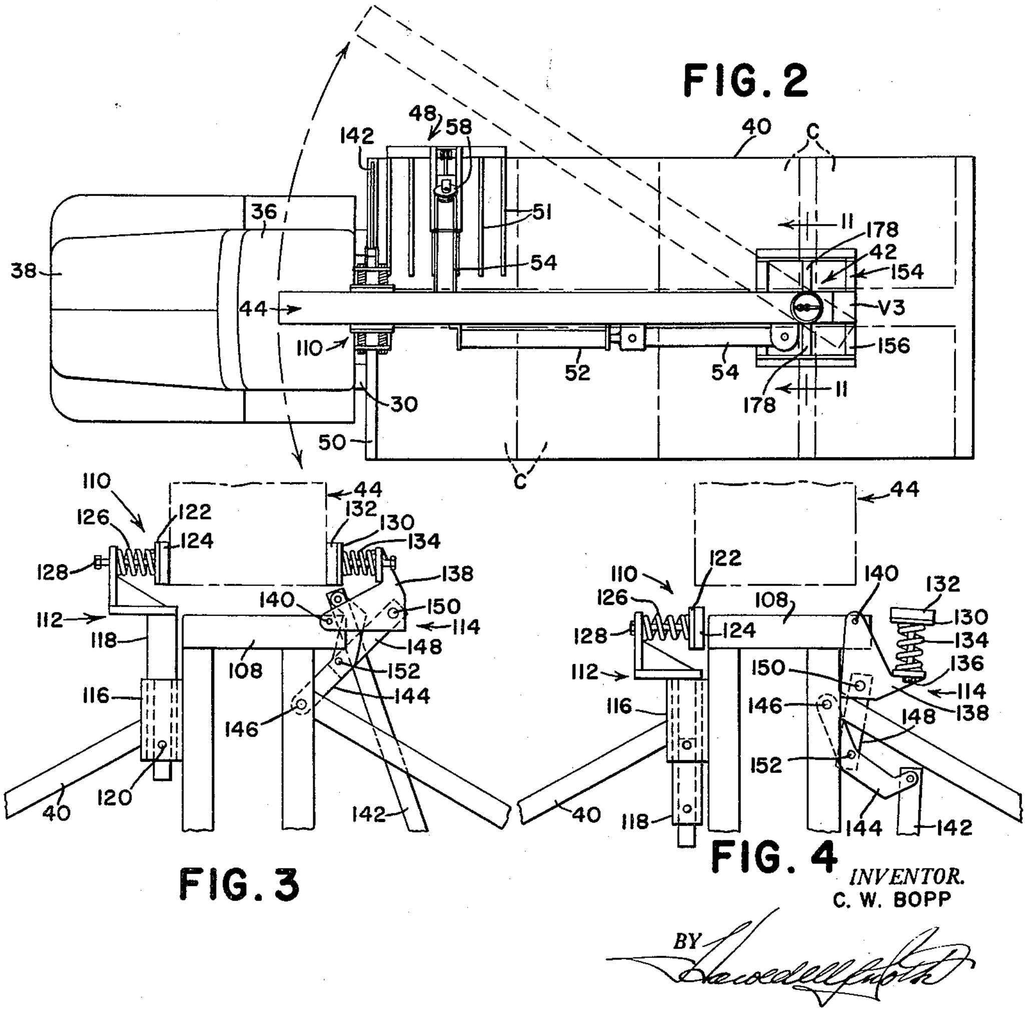
FIG. 2 is a plan of the same, illustrating in broken lines and by arrows the nature of the swingability of the boom.
FIG. 3 is an enlarged fragmentary section on the line 3—3 of FIG. 1, showing the extended or locked boom lock.
FIG. 4 is similar to FIG. 3 but shows the boom lock retracted or released.
Figure 19:
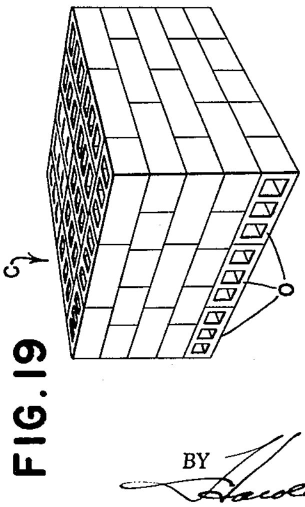
FIG. 19 is a pictorial perspective of a typical "cube" of building blocks.

FIGURES 1 and 2 are representative of the mounting of the apparatus on a conventional motor truck, illustrated pictorially as having a main body 30 carried on front and rear wheels 32 and 34 respectively, an operator's cab 36, an engine hood 38 which houses a typical internal combustion engine (not shown) and a flat horizontal bed 40 which serves as a base for the rigid mounting of mast structure 42. A horizontal boom 44 is carried by the mast structure for swinging through a range of approximately 400° and itself supports a rolling carriage 46 from which a material-handling device or fork 48 is suspended. An arched frame 50 is rigidly secured to and rises from the front edge of the bed 40 and typically carries protective material such as wire mesh (not shown) to protect the cab from the load of cubes C. These cubes are shown only in outline in FIGURES 1 and 2 but a view in greater detail appears in FIGURE 19 from which it will be seen that the lowermost rank or tier is arranged with its openings O alined so as to receive tines 51 on the fork whereby the entire cube may be raised and lowered via hoist means including the fork 48 and a fluid-pressure-operated motor 52 on the boom 44 and a cable 54 which depends from the carriage 46 by being trained over a pair of carriage-mounted sheaves 56 and which suspends the fork by being looped under a fork-mounted sheave 58. The hoist motor represents part of a system of operating means on the boom, other parts of which are set out below.

Figure 6:
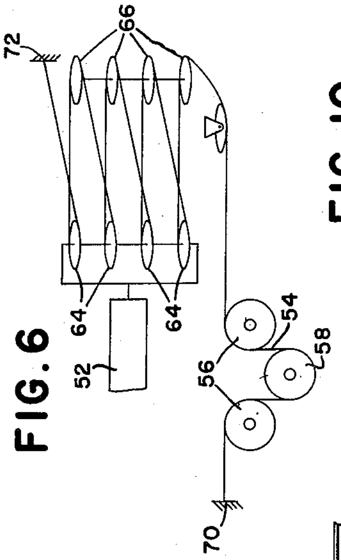
FIG. 6 is a schematic illustration of the motor and cable arrangement for the hoisting function.
Figure 7:
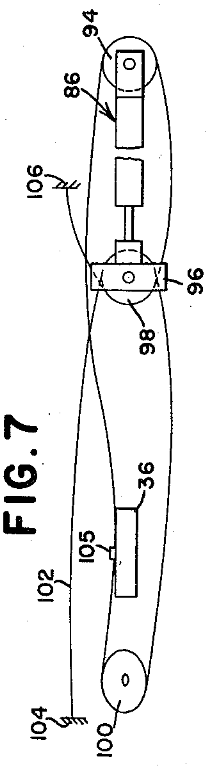
FIG. 7 is a schematic view of the motor and cable means for the carriage travel function.

The motor 52 comprises a hydraulic cylinder 60, rigidly mounted on the left side of the boom 44, and a piston having a piston rod 62 on the free or outer end of which is journaled a plurality (here four) of sheaves 64. Four sheaves 66 are journaled on the boom in rearwardly spaced relation to but alined with the sheaves 64, and an idler sheave 68 takes the cable 54 from the multiple sheaves 66 into the interior of the boom so as to reeve over the near carriage sheave 56. The run of the cable 54 over the other carriage sheave 56 is dead-ended on a free or forward part of the boom at 70. The opposite end of the cable 54 is dead-ended at 72 at a rear or mast-proximate part of the boom. See FIGURE 6 for a schematic outline of the cable and sheave arrangement, the main purpose of which is to secure the necessary vertical travel of the fork 48 with a reasonably short piston stroke. As will be seen, retraction and extension of the motor 52 respectively raises and lowers the fork. The manner in which fluid pressure is supplied to the motor and the controls therefor will be described subsequently.

The carriage 46 runs along the length of the boom on rollers 74 which ride track means 76 preferably milled in the upper faces of the lower flanges of a pair of inwardly facing channels 78 which constitute two sides of the boom. The carriage has a frame made up of a pair of cross members 80 which carry the rollers 74 and a longitudinal support or frame member 82 pivoted at its opposite ends to the cross members by pivots 84 coaxial on an axis lengthwise of the boom so that the support is rockable about that axis. The carriage sheaves 56 are journaled on this support and are therefore tiltable crosswise of the boom to accommodate vertical misalinement between the carriage and the fork 48 without causing the cable 54 to tend to run on or over the edges of the sheaves 56. A particular example of the utility of the tiltable sheaves 56 is illustrated in FIGURES 1 and 2, especially the latter, wherein it is shown that the fork 48 in a transport position may be carried at the right hand front corner of the load. Of course, there are other situations in which offsetting between the fork and boom will occur, but in any case, the tiltable sheaves 56 take care of the situation.

Figure 5:
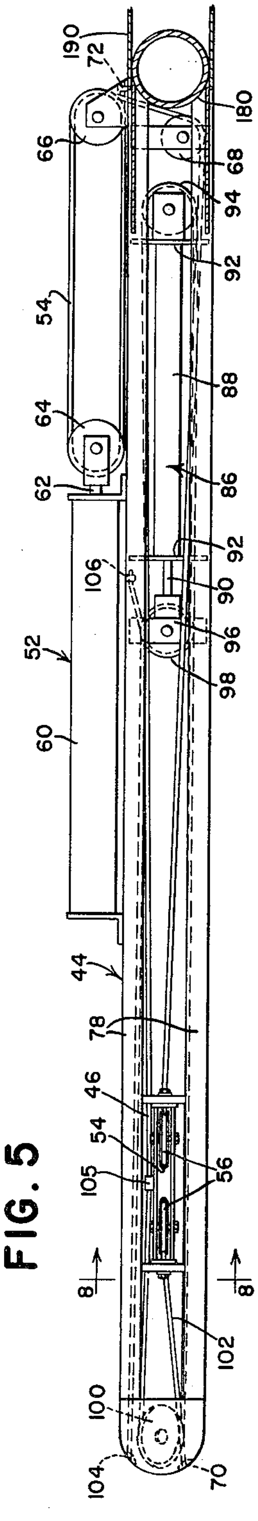
FIG. 5 is a bottom plan of the boom, showing a portion of the mast structure in section.

Travel of the carriage 46 lengthwise of the boom, or holding of the carriage in a fixed position while the fork is raised and lowered by the hoist motor 52, is accomplished by a fluid-pressure-operated carriage motor 86, again in the form of a cylinder 88 and piston and piston rod 90. This motor is a further part of the boom-mounted operating means of which the hoist motor 52 is also a part and is mounted within the boom (FIGURE 5), the cylinder 88 being suitably fixed to the boom channels 78 as by brackets 92. The rear end of the cylinder 88 carries a sheave 94, which could as well be carried directly by the boom if desired. The piston rod 90 extends from the front end of the cylinder and has a head 96 roller-guided in the channels and carrying a pair of coaxial sheaves 98. A fourth sheave 100 is journaled, preferably in an oblique position, at the free end of the boom. A carriage cable 102 is dead-ended at 104 at the free end of the boom (FIGURE 5), is looped about one sheave 98, then about the front sheave 100 and runs back to a clamped connection 105 to the carriage 46 and continues to the rear is looped about the rear sheave 94 to extend thence forwardly to loop about the other sheave 98 and extends thence back to be dead-ended on the boom at 106. The motor 86 is of the two-way or double-acting type and extends and retracts to cause the carriage 46 to travel or may be hydraulically locked to hold any selected position of the carriage. The controls for this motor will be covered later.

During transport of the loaded (or unloaded) truck, it is desirable that the boom be retained in a fore-and-aft position, preferably, of course, extending toward the front of the truck because of the rear location of the mast structure 42, which location is selected because of the added support and stability afforded by the tandem or bogie rear wheels 34. According to the present invention, the boom in its transport position extends forwardly over and beyond the previously described arch 50 behind the truck cab. The top of the arch, defined here by a cross member 108, is below the level of the boom so that it is cleared by the normally swingable boom, but for transport purposes the support carries a selectively extensible and retractible boom-locking means or device 110 (FIGURES 3 and 4).

This device comprises a stop element or means 112 and a lock element or means 114. The stop means includes an upright sleeve or tube 116, fixed to the support member 108, and a shaft 118 vertically shiftable in the tube 116 between extended and retracted positions as respects the level of the boom. The shaft may be releasably locked in its upper or extended position as by a removable pin 120 and carries spring-loaded pad means 122 having a frictional facing 124 such as brake shoe material or the like, engageable with the left side of the boom (FIGURE 3). Hence, the extended stop prevents leftward swinging of the boom and it remains only to extend the lock means 114 to confine the boom to its transport position. A spring 126 backs up the pad 122 of the stop and is adjustable, as by a screw 128, to vary the resiliency of the yielding means afforded by the pad.

The lock means 114 comprises pad means 130 having a friction face 132 similar to that at 124, and this pad is mounted by a spring 134, adjustable by a screw 136, on an arm 138 which is pivoted at 140 on the cross member 108 for vertical swinging between an extended position (FIGURE 3) and a retracted position (FIGURE 4). Control of the arm to secure its two positions is effected remotely by a control linkage 142 which extends downwardly and to the right (FIGURES 2, 3 and 4) so as to be within convenient reach of a person standing on the ground or on the running board of the truck. The linkage 142 is connected to the arm 138 by over-center-lockable linkage or releasable lock means comprising a first link 144 connected at one end to the linkage 142 and pivoted at its other end at 146 to the frame 50 and a second link 148 pivoted at one end at 150 to the arm 138 and pivoted at its other end at 152 to an intermediate part of the first link 144.

FIGURE 3 shows that the pivots 146, 150 and 152 are in over-center relation to retain the up position of the lock 114 so that the transport-position boom is gripped between the two spring-loaded pads 122 and 130. A downward force applied to the linkage 142 will break this over-center lock so that the arm and associated parts swing to the FIG. 4 or retracted position. This releases the boom for turning or swinging about the mast to the right, and if the range of the boom to this extent is not sufficient, the user simply releases the pin 120 from the stop sleeve 116 and stop shaft 118 so that the stop element can drop to its down or retracted position. Reversal of the above procedure extends the boom lock device to again secure the transport position of the boom.

Figures 11, 12, 12A:
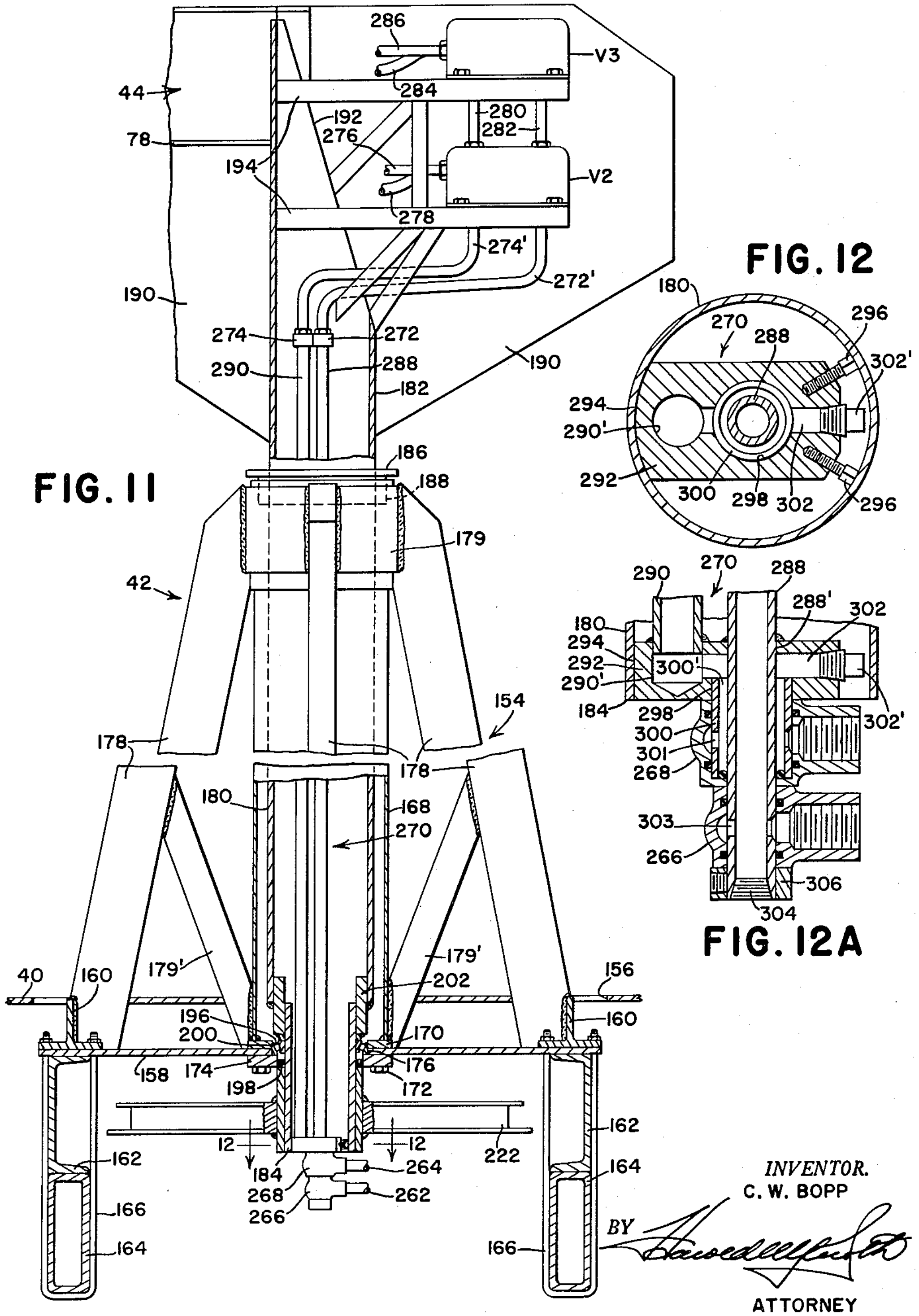
FIG. 11 is a section of the mast structure on an enlarged scale and with portions broken away, as seen along the line 11—11 of FIG. 2, and considering the boom as having been swung 90 degrees to the left.
FIG. 12 is an enlarged section of the mast on the line 12—12 of FIG. 11.
FIG. 12A is an enlarged section of the lower part of the conduit means.

The mounting and structural characteristics of the mast structure 42 are best shown in FIGURE 11. In the preferred embodiment of this structure, it is provided as a unit attachment that may be mounted on any of several types of conventional motor truck beds and to that end is made up of a basic mount 154 of fabricated welded construction receivable in a rectangular or square opening 156 cut out of the truck bed or floor 40 (FIGURES 2 and 11). The bottom of the mount is a rectangular or square steel plate 158 bordered by sturdy steel bars 160 of T section that are welded to the plate. This much of the mount is rigidly affixed to stringers 162 of the bed 40 and to the chassis rails 164 of the truck body of main frame, a plurality of U-bolts 166 being shown as representative of the type of securing means that have proven acceptable. Here, as in the case of securing by welding, other methods could be employed within the spirit of the teachings outlined.

Rigidly secured to and rising from the center of the mount plate 158 is an external or outer mast tube 168 that has welded or otherwise secured to its lower end a flange 170 which is secured as by cap screws 172 and a lower circular plate 174 to the plate 158 with the mast tube in register with a central circular aperture 176 in the plate. Braces 178, preferably of rectangular-section steel tubes, are welded between the bordering T-members 160 and a top ring or collar 179 which is welded to the upper end of the mast tube 168. Short intermediate braces 179′ are welded between the braces 178 and the lower part of the structure 154. The fabricated mount just described may be handled as a unit and forms the central fixed part of the mast structure 42 about which the boom 44 is swingable on bearing or journaling means to be described below.

The boom 44, considered as a swingable element, includes as an integral part thereof, at least functionally, depending means comprising an inner tube or spindle 180 which is coaxially receivable within the mast tube 168 and which extends from an upper end portion 182 above the level of the mast collar 179 to a lower end portion 184 below the level of the bottom of the mast tube as defined by the junction of said mast tube with the base plate 158. The spindle 180 has rigidly welded thereto, just above the mast collar 179, a flange or collar means 186 which cooperates with the mast collar to journal the spindle via upper bearing means 188. The spindle is rigidly joined to the boom via welded plates 190 and hence the two rotate in unison about the vertical axis of the mast. The upper part 182 of the spindle has a rear opening 192, preferably cut diagonally to the spindle axis and intermediate the level of the top of the boom and the mast collar 179. The opening is diametrically opposite to the position of the boom 44, for purposes to presently appear. The plates 190 and the spindle 180 are welded to the side channels 78 of the boom so that the entirety is an integrated rigid structure, and the spindle has welded thereto a plurality of support members 194 which project rearwardly from and at the level of the rear wall opening 192.

Journaling of the spindle 180 on the mast tube and mount 154 includes the upper bearing 188 and lower bearing means 196. Appropriate lubricant and dust seals may be used, as at 198. These bearings are suitably spaced apart axially and operate to take radial and thrust loads imposed on the mast structure by the boom and the load to which the boom is subjected during operation cooperate to attain free journaling of the boom without binding.

The lower bearing 196 may be a suitable tapered roller bearing, such as the well-known Timken type, for example, and is received in a raceway 200 in the plate 170 at the bottom of the mast tube 168 and supports the spindle 180 via a thrust ring 202 welded to the spindle.

The depending or downwardly projecting end 184 of the inner rotatable tube 180 has fixed thereto, as by a suitable key (not shown), a cable-receiving sheave 222 which forms part of power-operated means for effecting turning of the boom about the mast axis. This sheave is of relatively large diameter and is protectively received not only below the bed 40 of the truck but also between the stringers 162 and chassis rails 164. In the assembly of the components of the boom and mast, the spindle 180 is inserted downwardly through the mast tube 168 and the sheave 222 is then mounted on the lower end of the spindle 180 and appropriately secured by its key and any other adequate means.

Figure 13:
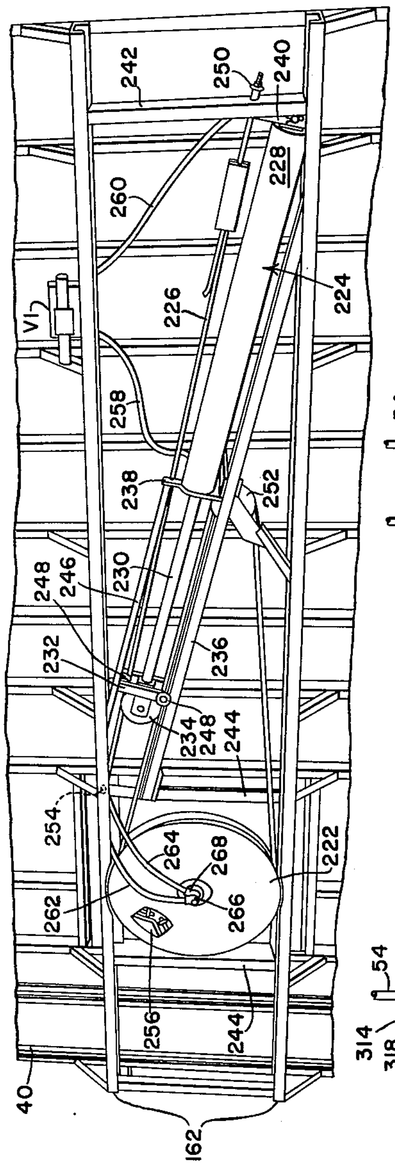
FIG. 13 is a bottom perspective of the truck bed and mast-turning means, enlarged over FIG. 1 and turned end-for-end as respects FIGS. 1 and 2.
Figure 14:
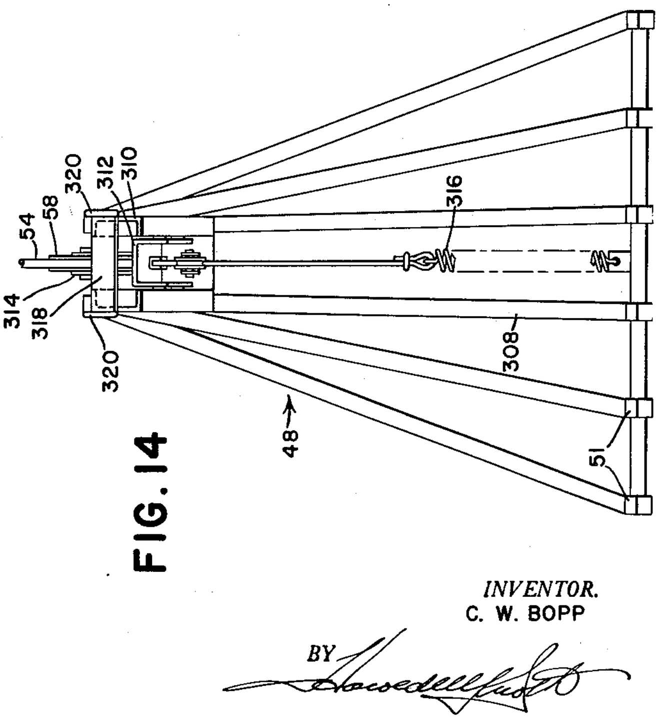
FIG. 14 is an enlarged end view of the load-handling fork.
Figure 15:
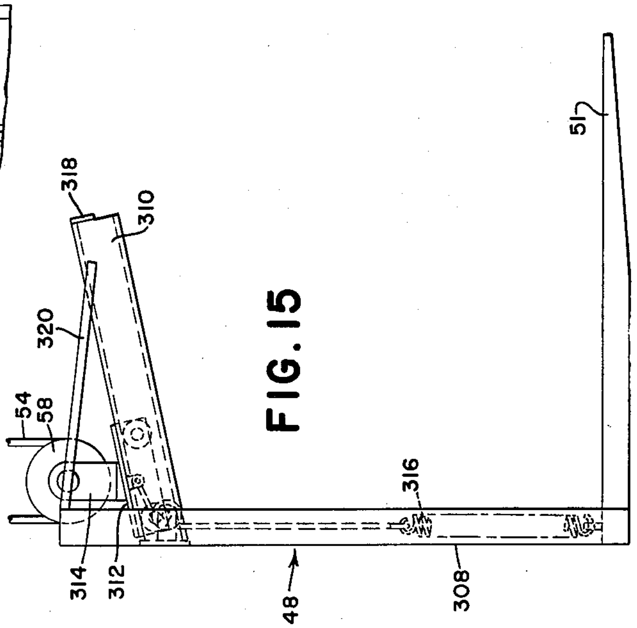
FIG. 15 is a side view of the same.

A fluid-pressure-operated motor 224 is an additional part of the boom-swinging means and cooperates with the sheave 222 via a cable 226. The motor 224 comprises a hydraulic cylinder 228 of the double-acting type having a piston 230 provided with a head 232 on which is mounted a pair of coaxial sheaves 234 (FIGURE 13). A combined support and guide member 236 extends diagonally between opposite bed stringers 162 and supports the cylinder 228 via a bracket 238 at one end of the cylinder. A second bracket 240 mounts the other end of the cylinder on a cross member 242 between the stringers. Additional cross members 244 box in the sheave 222 and the sheave is thus protectively embraced by frame members. A second guide 246 extends between the bracket 238 and the near stringer 162 and combines with the other guide 236 to carry the piston rod head 232 via rollers 248.

The cable 226 is dead-ended at one end at 250 to the cross member 242, is looped about one piston sheave 234 and about a sheave 252 journaled on the guide 236, and extends to the main sheave 222, about which the cable is wrapped twice before being looped about the other piston sheave 234 and then dead-ended at 254 on the right-hand stringer 162. One wrap of the cable 226 about the sheave is secured to the sheave as by a clamp 256 so that extension and retraction of the double acting motor 224 swings the boom via the sheave through its angular range of 360°. The mounting of the motor 224 and its relation to the sheave 222, plus the manner in which the cable is arranged and the piston head guided, afford a compact structure substantially concealed beneath the truck bed.

Figure 10:
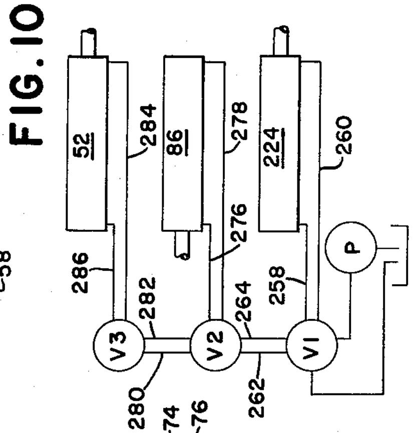
FIG. 10 is a schematic view of a representative hydraulic control system.
Figure 9:
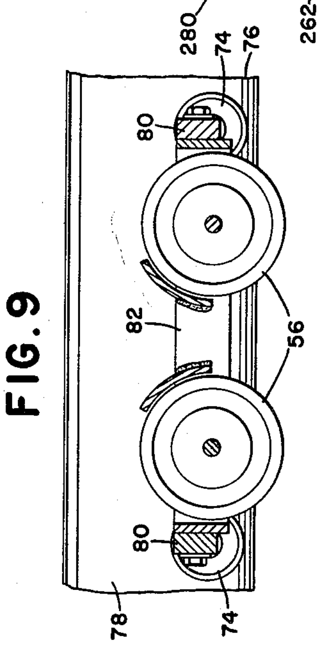
FIG. 9 is a section along the line 9—9 of FIG. 8.
Figure 8:
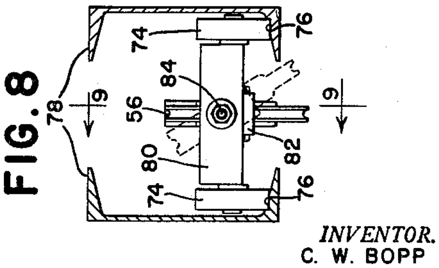
FIG. 8 is an enlarged section as seen along the line 8—8 of FIG. 5.

The three motors 224, 86 and 52 are part of a hydraulic control system shown schematically in FIGURE 10 as including a series arrangement of three control valves $V_1$, $V_2$ and $V_3$, respectively, and a pressure source including a pump P suitably driven from the truck power plant in any conventional manner. FIGURE 13 shows a typical mounting of the valve $V_1$ for the boom-swinging motor 224 and FIGURES 1 and 11 illustrate an acceptable mounting of the valves $V_2$ and $V_3$ on the support means 194 behind the spindle rear wall opening 192. Since these valves may be of any well-known type they need not be shown or described in detail. Suffice it to note that the valve $V_1$ is immediately downstream from the pump P and fluid passes therethrough, whether or not the motor 224 is operated, to the valve $V_2$ and thence to the valve $V_3$ before returning to the reservoir side of the fluid-pressure source. Hence, the valves may be selectively operated individually or simultaneously, preferably by a solenoid-powered remote controller of no significance in this application, thus enabling the operator to dismount from the truck and stand conveniently at the loading or unloading site while handling the load-transfer operation.

Fluid lines 258 and 260 from the valve $V_1$ to the motor 224 are visible in FIGURE 13 as well as in FIGURE 10, as are lines 262 and 264 from the valve $V_1$ to lower connectors 266 and 268 at the center of the sheave 222. These connectors, together with a novel conduit means 270, are best shown in FIGURES 11, 12 and 12A, wherein it is clear that the conduit means 270 extends coaxially through the mast structure to exit at upper connectors 272 and 274 which lead to the valve $V_2$ via line extensions 272′ and 274′ respectively. The valve $V_2$ leads of course to the motor 86 via lines 276 and 278 and to the valve $V_3$ via lines 280 and 282 and the last-named valve is connected to the motor 52 by lines 284 and 286. The latter lines appear primarily in FIG. 10 and only generally in FIG. 11, since the details are not material.

The conduit means 270 incorporates or provides extensions of the lines 262 and 264 to the connectors 272 and 274 via a pair of parallel tubes or conduits 288 and 290, respectively, which are rigidly carried at their lower ends by a mounting block 292, one edge 294 of which is arcuate to abut an inner portion of the spindle and the opposite edge of which carries a pair of angularly related mounting means or set screws 296. The entire assembly 270 is insertable upwardly through the spindle 180 and when properly located the set screws 296 are backed out into abutting or expansive relation to the spindle wall portion generally diametrically opposite to the arcuate edge 294 of the block. Ready removal of the assembly is accomplished by reversing the foregoing procedure.

The block 292 is drilled or bored at 288′ and 290′ to respectively receive the tubes 288 and 290, the connections of which to the block may be effected by welding. The bore 288′ is coaxial with the spindle 180 and goes clear through the block, opening at a lower counterbore 298 which receives a sleeve 300 on which the lower connector 268 is rotatably mounted. The bore 290′ is blind and is intersected by a cross bore 302 which is plugged at its entry end by a pipe plug 302′. The sleeve 300 leads to the cross bore 302 at 300′ and to the connector 268 at 301, and the cross bore of course leads to the tube 290 at 290′.

The tube 288 extends axially through the block 292 and sleeve 300 and rotatably receives the lower connector 266, with which it communicates via openings 303. The lower end of the tube 288 is plugged at 304 and a retainer 306 completes the assembly. This arrangement affords separate fluid flow through the tubes 288 and 290 and also achieves a common mounting therefor in and coaxially of the spindle 180. The joints of the connectors 266 and 268 respectively with the tubes 288 and 290, while appropriately sealed to control leakage, allow adequate swivel action to enable turning of the boom and spindle without wrapping of the lines 262 and 264. Since the valves $V_2$ and $V_3$ are mounted on the spindle, as are the motors 52 and 86, there will be no wrapping of the upper lines. Moreover, since these valves and line portions are carried at a level below the top of the boom, entanglement with trees and other overhanging objects and structure is avoided.

The fork 48, in addition to the tines 51, includes an upright back frame 308 and an inclined track 310 along which a roller-mounted shoe 312 rides according to the center of gravity of the fork when loaded and empty. The shoe has a clevis 314 which journals the fork sheave 58 and is normally biased to the back of the track 310 as by a tension spring 316. The details of the fork are not material to the present disclosure, it being sufficient to note that when the fork is empty the spring 316 draws the shoe 312 and hence the sheave 58 downhill or rearwardly so that the empty fork hangs level, which facilitates insertion of the tines 51 into the openings O of a cube C. When the fork is loaded with a full cube, initial lifting tension on the hoist cable 54 causes the shoe 312 to ride uphill to engage a stop 318 at the far end of the track 310, and the loaded fork, when lifted, will be suspended level. Suitable braces 320 are installed between the fork back 308 and the track 310.

Figure 16:
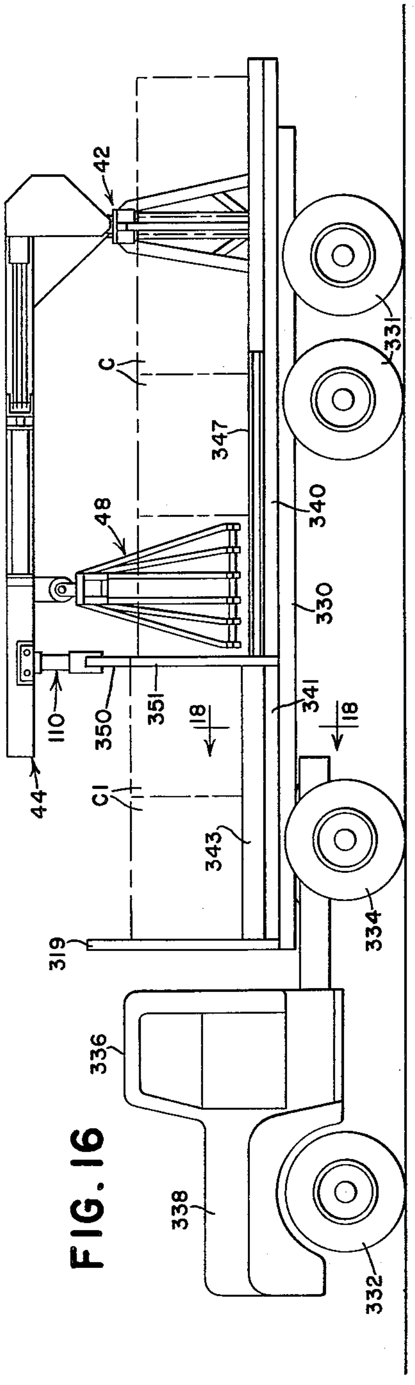
FIG. 16 is a side elevation of a modified truck and load-handling arrangement.
Figure 17:
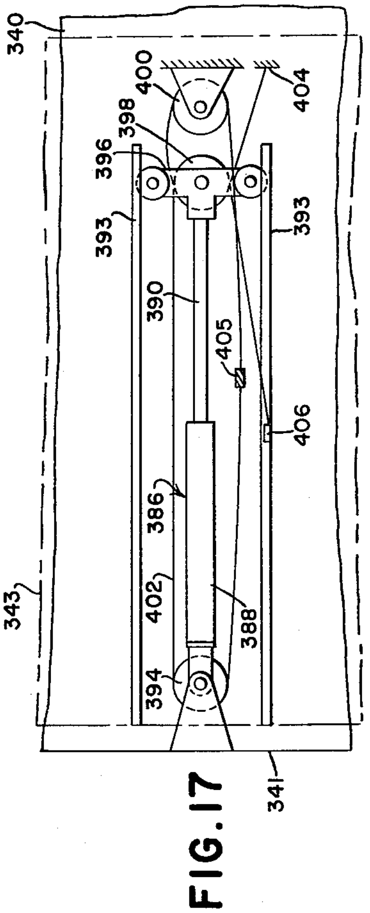
FIG. 17 is an enlarged fragmentary plan of an intermediate part of the structure of FIG. 16, a part of the view being in broken lines to facilitate a showing of underlying mechanism.

In the modified apparatus shown in FIGURES 16, 17 and 18, the foregoing principles are applied to a motor vehicle of the semi-trailer type, which is chosen for purposes of illustration because a semi-trailer bed, such as that indicated at 340, is of substantial length; although, it will be clear that a straight truck could have a long bed and utilize the principles to be set out below.

The semi-trailer includes a tractor having front and rear wheels 332 and 334, a cab 336 and engine hood 338. The trailer body or frame 330 has its own wheels 331 and mounts a mast structure identical to that previously described and hence denoted by the same numeral 42. To the extent that the load-handling components are the same, they will be identified by reference numerals as applied to the description of FIGURES 1–15. Thus, the mast structure 42 carries a swingable boom 44 and the boom in turn suspends a fork 48.

As will be readily perceived, the trailer bed 340 is considerably longer than the truck bed 40 and, when the same boom 44 is used, a forward portion of the bed or a bed extension, as at 341, will be beyond the reach of the boom. Of course, a longer boom could be provided but experience has shown that the increased length disturbs stability of the vehicle when the boom is swung to either side or to the rear. According to the present invention, the apparent problem is eliminated by additional load-carrying means, here in the form of a dolly or carriage 343 having side-mounted rollers 345 by means of which it is carried in tracks 347 on the bed and bed extension 340—341 for fore-and-aft movement. The tracks 347 are in the form of channels which extend along opposite sides of the bed 340 for a distance at least equal to about twice the length of the dolly so that when the dolly is moved to its rear position (from its forward position as shown), it will be stably supported for free travel.

The bed 340 carries a main load of cubes C and an additional load of cubes $C_1$ is carried by the dolly 343, these cubes $C_1$ being normally forwardly of and hence out of reach of the boom during transport. During loading of the vehicle by the boom, the dolly will have first been moved to a rear load-transfer position within reach of the boom, and, after being loaded with the cubes $C_1$, will be moved to its forward or transport position to permit loading of the cubes C on the bed 340. During unloading, the cubes C are first unloaded and then the dolly is moved to the rear for unloading of the cubes $C_1$.

Figure 18:
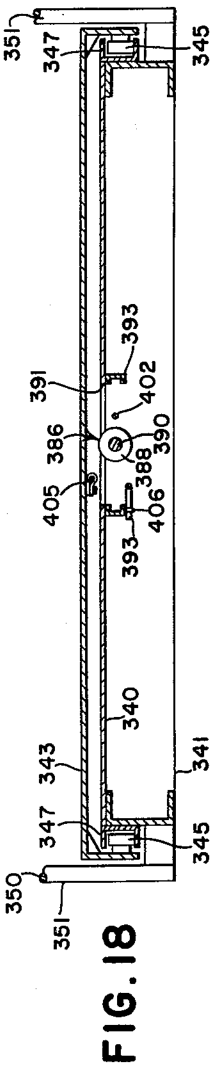
FIG. 18 is an enlarged section on the line 18—18 of FIG. 16.

The dolly carries at its front end a protective frame 349 for preventing forward shifting of the load of cubes $C_1$, and since the boom 44 does not reach to this frame the boom lock 110 (FIGURES 3 and 4) is installed on a rearward support 350 having an arched construction including opposite upright legs 351 between which the dolly can move fore-and-aft (FIGURE 18). The boom lock operates as described above in connection with FIGURES 1–15 and need not be elaborated. Likewise, the frame 349 could be mounted at the front end of the bed extension 341 if desired.

Fore-and-aft shifting of the dolly is accomplished by power, here a motor and sheave arrangement operating on the principles of the carriage-shifting motor 86 and its associated cable. For the dolly arrangement, a hydraulic motor 386 is shown as comprising a cylinder 388 which operates to extend and retract a piston rod 390 on which is journaled a pair of coaxial sheaves 398. This mechanism is conveniently mounted intermediate the floor of the dolly 343 and the bed 340, a portion of the latter being cut out if desired as at 391 and framed at 393 for strength, the frame members serving also as guides for a piston rod head 396 so that the guiding system is similar to that involving the boom 44 and head 96 on the carriage motor piston rod 90. A cable 402 is dead-ended at one end at 404 on the bed 340 or the extension 341 thereof and is looped about one of the piston rod sheaves 398 and back about a sheave 400 journaled adjacent the dead-end 404, whence it extends forwardly to a journaled sheave 394 at the front of the bed extension, back around the other piston rod sheave 398 and dead-ended at its terminal end at 406 on the bed extension by means of the guide frame 393. An intermediate portion of the cable is secured, as by a clamp 405, to the underside of the dolly so that extension and retraction of the motor 386 moves the dolly respectively forwardly and rearwardly.

The operation of the preferred forms of the mechanisms in their entireties, as well as in conjunction with the disclosed subcombinations, is deemed to be included in the foregoing description and need not be repeated in detail. It will be sufficient to note that the apparatus is especially adapted for unit attachment to a motor truck of the straight or semi-trailer type, but dimensional characteristics and other peculiarities of the chosen structure should not be construed as limiting the apparatus as to broad utility and novelty in those respects only; although, specific novelty as to portability is evident. Likewise, rearrangements of the parts and even wide deviation from the preferred embodiments may be indulged without departing from the spirit and scope of the invention.

What is claimed is:

1. In load-handling apparatus of the class described, the combination of a supporting bed; mast means secured to and rising from said bed and having an upper end; a boom secured at one end to the upper end of the mast and extending horizontally radially therefrom to a remote end, said boom being hollow and including a pair of laterally spaced apart parallel members respectively having lower longitudinal flanges projecting laterally inwardly to afford a pair of tracks; a carriage within the boom and riding said tracks intermediate the ends of the boom; sheave means spaced longitudinally of and lying within the boom to be substantially enclosed thereby; a first hydraulic motor of the cylinder and piston type lying lengthwise of and within the boom; cable means running lengthwise of and enclosed by the boom and connected among the boom, carriage and sheave means so that extension and retraction of said motor runs the carriage back and forth on the boom; a second hydraulic motor having cylinder and piston parts and disposed lengthwise of the boom externally thereof and lying alongside one of the boom members with one of said parts anchored to the boom and the other of said second motor parts being relatively movable; a first set of plural sheaves carried by the boom externally thereof and longitudinally alined with the second motor; a second set of plural sheaves carried by the relatively movable part of said second motor in longitudinal alinement with said first set; a pair of pulley wheels on the carriage within the boom; second cable means having one run thereof within and anchored to the boom and extending along the boom and thence over the pulley wheels to depend between said wheels as a load-supporting loop, said cable run running thence within and lengthwise of the boom to a portion proximate to one of the sets of plural sheaves and thence externally thereof as a second run trained about the plural sheave sets and having a terminal end anchored to the boom; guide means on the boom for carrying said second cable at said portion; and fluid pressure means connected independently to the motors for selectively extending and retracting the first motor to move the carriage and for selectively extending and retracting the second motor to raise and lower the load-supporting loop.

2. In apparatus including hollow mast means having upper and lower ends, a hollow spindle journaled in the mast means and having a lower end adjacent to the lower end of the mast means and an upper end projecting above the upper end of the mast means, a boom secured to the upper end of the spindle above the mast means and operating means on the boom, the improvement comprising: power means for the operating means including a pair of fluid conduits extending through the spindle; and means supporting the conduits, including a member commonly supporting the conduits and expansive means including an edge portion of the member engaging a proximate portion of the interior of the spindle and a threaded device in the member forcibly engaging an angularly related interior portion of said spindle.

3. In mechanism of the class described, the combination of: base structure; a tubular mast secured to said structure and having an upper end; a tubular spindle coaxially received in and journaled on the mast and having an upper part projecting above the upper end of the mast, said upper part having an opening in the wall thereof; a boom secured to the upper part of the spindle substantially diametrically opposite and generally at the level of the opening and projecting in one direction away from the spindle; a carriage movable along the boom; a fluid motor on the boom and connected to and for operating the carriage; support means on the spindle diametrically opposite the boom and at the level of the opening and extending away from the spindle in the direction opposite the boom and through said opening; protective plate means secured to the spindle generally as prolongations of opposite sides of the boom and extending in flanking relation to the support means to substantially enclose said support means; valve means on the support means between the plate means and fluid-connected to and for controlling the motor; and fluid-transmitting means extending upwardly through the spindle and connected to the valve means.

References Cited in the file of this patent

UNITED STATES PATENTS

| | | |
|---|---|---|
| 383,815 | Kilborn | May 29, 1888 |
| 470,538 | Bennetts | Mar. 8, 1892 |
| 686,004 | Mudd | Nov. 5, 1901 |
| 923,384 | Thomson | June 1, 1909 |
| 981,268 | Hurd | Jan. 10, 1911 |
| 2,019,938 | Stephens | Nov. 5, 1935 |
| 2,101,839 | Crawford | Dec. 14, 1937 |
| 2,109,304 | Ormsby | Feb. 22, 1938 |
| 2,462,926 | Wilson | Mar. 1, 1949 |
| 2,503,590 | Ormsby | Apr. 11, 1950 |
| 2,559,773 | Pitman | July 10, 1951 |
| 2,635,771 | Black | Apr. 21, 1953 |
| 2,730,249 | Edwards | Jan. 10, 1956 |
| 2,746,619 | Kuhlenschmidt | May 22, 1956 |
| 2,754,977 | Przybylski | July 17, 1956 |
| 2,757,752 | Kaufman | Aug. 7, 1956 |
| 2,759,616 | Weyhausen | Aug. 21, 1956 |
| 2,772,795 | Cramer | Dec. 4, 1956 |
| 2,773,606 | Shepherd | Dec. 11, 1956 |
| 2,774,483 | Raymond | Dec. 18, 1956 |
| 2,794,557 | Vero | June 4, 1957 |
| 2,812,868 | Crile | Nov. 12, 1957 |
| 2,919,036 | Raymond | Dec. 29, 1959 |